United States Patent [19]

Lee

[11] Patent Number: 4,770,398

[45] Date of Patent: Sep. 13, 1988

[54] ENGINE MOUNT ASSEMBLY

[75] Inventor: Ping Lee, Kitchener, Canada

[73] Assignee: The Standard Products Company, Cleveland, Ohio

[21] Appl. No.: 93,379

[22] Filed: Sep. 4, 1987

[51] Int. Cl.⁴ .................. F16F 1/36; B60G 11/22; F16M 13/00; B62D 21/00

[52] U.S. Cl. .................. 267/293; 180/312; 248/635; 248/659; 267/153

[58] Field of Search .......... 267/136, 140, 140.3, 267/141.2, 141.5, 152, 153, 292, 293; 180/312, 300; 123/192 R, 192 A; 248/659, 635, 638; 16/DIG. 33, 2

[56] References Cited

U.S. PATENT DOCUMENTS 1,975,910 10/1934 Trott .................. 248/659 X
3,731,896 5/1973 Femlberg .................. 267/140.3

FOREIGN PATENT DOCUMENTS 0898054 4/1945 France .................. 267/292

Primary Examiner—Andres Kashnikow
Assistant Examiner—Robert J. Oberleitner
Attorney, Agent, or Firm—Harness, Dickey & Pierce

[57] ABSTRACT

An engine mounting device resiliently supports an engine on a frame including a first plate member for connection to the frame. A second plate member is U-shaped and has flanges at each end of the U-shaped portion for connection to the first plate member and the frame. A tubular member is disposed between and spaced from the first plate member and the second plate member. A resilient member interconnects the tubular member and the first and second plate members for resiliently supporting the tubular member between the first and second plate members. The first plate member includes a plurality of raised ribs laterally spaced one from the other and forms an arch-shaped opening for receiving a first end of the resilient member to prevent lateral movement of the resilient member. The resilient member has a second end arcuate and complimentary to the U-shaped portion of the second plate member to prevent lateral and radial movement of the resilient member.

4 Claims, 1 Drawing Sheet

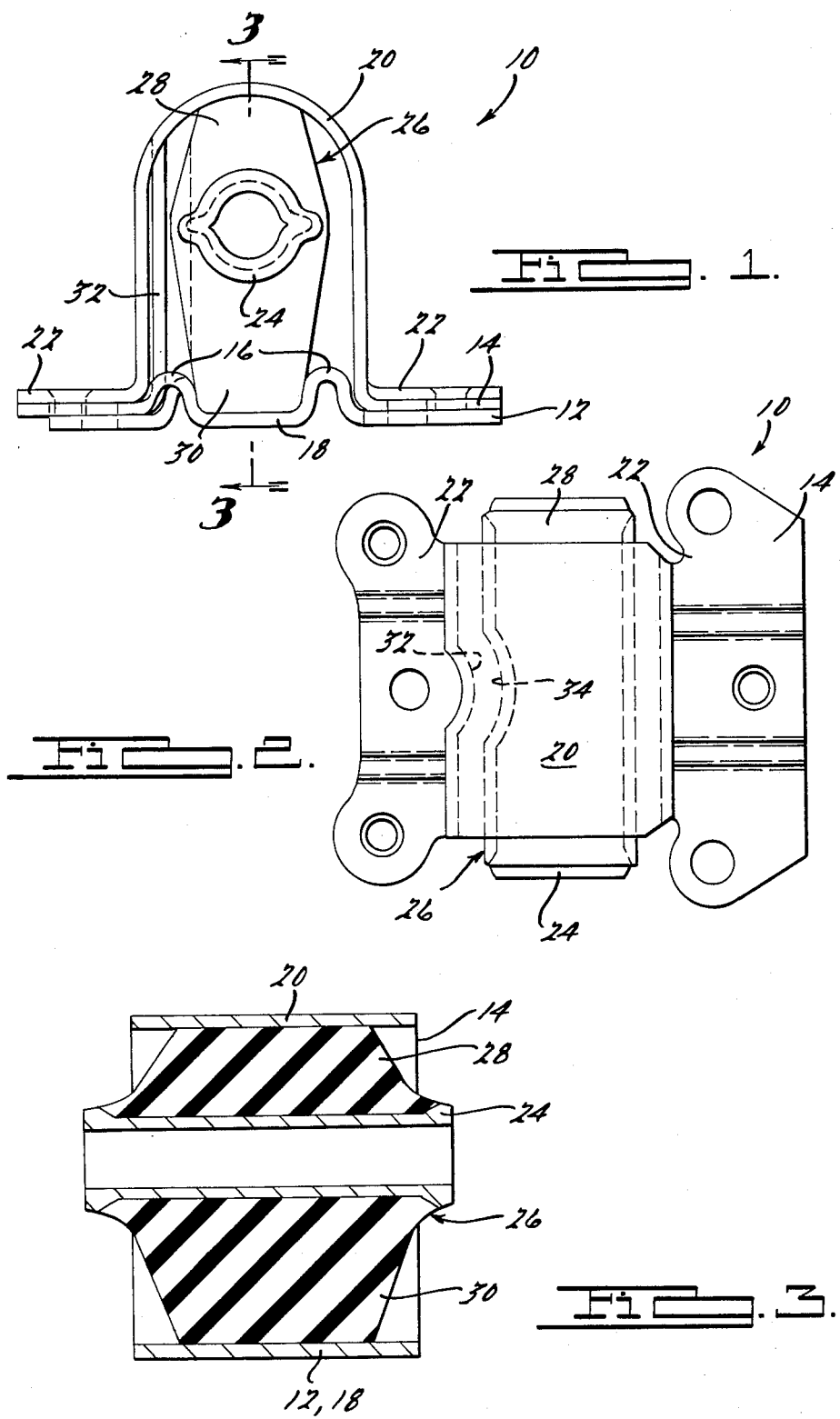

ENGINE MOUNT ASSEMBLY

TECHNICAL FIELD

The subject invention relates to an engine mounting device for resiliently supporting an engine on a frame.

BACKGROUND AND SUMMARY OF THE INVENTION

Engine mount assemblies for resiliently supporting an engine on a frame of a motor vehicle have been used in the past. A typical example of an engine mount assembly is disclosed in U.S. Pat. No. 3,731,896, issued May 8, 1973 in the neme of Fehlberg. This patent discloses an engine mount assembly including a bushing and bracket having a plurality of cooperating opposed walls for providing separate spaces in which rubber is molded and assembled in compression to provide a resilient engine mount. The bushing and bracket cooperate to limit relative movement of the engine with respect to the frame in all directions.

The problem with such engine mount assemblies is that the resilient member and brackets have to be specially formed with ribs and grooves. Further, the engine mount includes inner bracket stiffening members resulting in numerous parts and added expense. The fabrication of such an engine mount assembly may be very costly and time consuming.

The subject invention is an engine mounting device for resiliently supporting an engine on a frame including a first plate member for connection to the frame. A second plate member is U-shaped and has flanges at each end of the U-shaped portion for connection to the first plate member and the frame. A tubular means is disposed between and spaced from the first plate member and the second plate member. A resilient means interconnects the tubular means and the first and second plate members for resiliently supporting the tubular means between the first and second plate members. The first plate member includes a plurality of raised ribs laterally spaced one from the other and forms an arch-shaped opening for receiving a first end of the resilient means to prevent lateral movement of the resilient means. The resilient means has a second end arcuate and complimentary to the U-shaped portion of the second plate member to prevent lateral and radial movement of the resilient means.

Accordingly, the subject invention provides a much simpler and less expensive mounting assembly to manufacture. Further, there are fewer parts involved.

FIGURES IN THE DRAWINGS

Other advantages of the present invention will be readily appreciated as the same becomes better understood by reference to the following detailed description when considered in connection with the accompanying drawings wherein:

FIG. 1 is an end view of the engine mount assembly of the subject invention;

FIG. 2 is a plan view of the engine mount assembly of Figure 1; and

FIG. 3 is a sectional view of the engine mount assembly taken along lines 3—3 of FIG. 1.

DETAILED DESCRIPTION OF THE PREFERRED EMBODIMENT

An engine mounting assembly or device for resiliently supporting an engine (not shown) on a frame (not shown) is generally shown at 10 in FIG. 1. The device 10 includes a first plate member 12 for connection to the frame and a second plate member 14 for connection to the first plate member 12 and the frame. The first plate member 12 is generally flat and includes a plurality of raised ribs 16 laterally spaced one from the other and forming an arch-shaped opening 18. The second plate member 14 includes a U-shaped portion 20 and flanges 22 at each end of the U-shaped portion 20 for connection to the first plate member 12 and the frame.

The device 10 includes a tubular member 24 disposed and spaced from the first plate member 12 and second plate member 14. A resilient member 26 is formed around the tubular member 24 and interconnects the tubular member 24 and the first 12 and second 14 plate members for resiliently supporting the tubular member 24 between the first 12 and second 14 plate members. The resilient member 26 may be formed as one piece or from two separate members. The resilient member 26 is formed of an elastomeric material and includes a first or top portion 28 and a second bottom portion 30.

Either one of the first or top and second or bottom elastomeric members may comprise a hard elastomeric material and the other a soft elastomeric material. The bottom portion 30 of the resilient member 26 is received in the arch-shaped opening 18 to prevent lateral movement of the resilient member 26. The top portion 28 of the resilient member 26 is arcuate at one end thereof and complimentary to the U-shaped portion 20 of the second plate member 14 to prevent lateral and radial movement of the resilient member 26. This restrains relative lateral and radial movement between the tubular member 24 and the late members 12, 14.

The tubular member 24 also is restrained from longitudinal movement with the first 12 and second 14 plate members. A rib 32 is formed in the side wall of the U-shaped portion 20 of the second plate 14 and extends inwardly toward the resilient member 26. A complimentary detent 34 is formed in the resilient member 26 and tubular member 24. Thus, the relative movement between the tubular member 24 and the plate members 12, 14 in the x, y, and z directions is limited.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An engine mounting device for resiliently supporting an engine on a frame, said device comprising:
    a first plate member for connection to the frame;
    a second plate member including a U-shaped portion and having flanges at each end of said U-shaped portion for connection to said first plate member and the frame;
    tubular means disposed between and spaced from said first plate member and said second plate member;
    a resilient means interconnecting said tubular means and said first and second plate members for resiliently supporting said tubular means between said first and second plate members;
    said first plate member including a plurality of raised ribs laterally spaced one from the other and forming an arch shaped opening for receiving a first end of said resilient means to prevent lateral movement of said resilient means;

said resilient means having a second end arcuate and complimentary to said U-shaped portion of said second plate member to prevent lateral and radial movement of said resilient means.

2. A device as set forth in claim 1 further characterized by said resilient means comprising a first elastomeric member interconnecting said first plate member and said shaft member, and a second elastomeric member interconnecting said second plate member and said shaft member.

3. A device as set forth in claim 2 further characterized by either one of said first and second elastomeric members being made of a hard elastomeric material and the other being made of a soft elastomeric material.

4. An engine mounting device for resiliently supporting an engine on a frame, said device comprising:

a first plate member for connection to the frame;

a second plate member being U-shaped and having flanges at each end of said U-shaped portion for connection to said first plate member and the frame;

a tubular means disposed between and spaced from said first plate member and said second plate member;

a resilient means interconnecting said tubular means and said first and second plate members for resiliently supporting said tubular means between said first and second plate members;

said first plate member including a plurality of raised ribs laterally spaced one from the other and forming an arch-shaped opening for receiving a first end of said resilient means to prevent lateral movement of said resilient means;

said resilient means having a second end arcuate and complimentary to said U-shaped portion of said second bracket to prevent lateral and radial movement of said resilient means;

longitudinal restraining means for locating and preventing movement of said resilient means within said first and second plate members;

said longitudinal restraining means comprising a rib in said second plate member and a complimentary detent in said resilient means.

* * * * *